United States Patent [19]

Akiyama et al.

[11] Patent Number: 5,774,651
[45] Date of Patent: Jun. 30, 1998

[54] FALSE STATEMENT DETECTION SYSTEM

[75] Inventors: Ryota Akiyama; Makoto Yoshioka, both of Kawasaki, Japan

[73] Assignee: Fujitsu Limited, Kawasaki, Japan

[21] Appl. No.: 654,343

[22] Filed: May 28, 1996

[30] Foreign Application Priority Data

Sep. 20, 1995 [JP] Japan ................................. 7-242126

[51] Int. Cl.$^6$ .................................................. G06F 11/00
[52] U.S. Cl. ........................ 395/186; 395/187.01; 380/4; 380/23; 364/222.5; 364/286.4
[58] Field of Search ............................. 395/186, 187.01, 395/188.01; 380/3, 4, 23, 25; 364/286.4, 286.5, 222.5

[56] References Cited

U.S. PATENT DOCUMENTS

| | | | |
|---|---|---|---|
| 4,528,643 | 7/1985 | Freeny, Jr. ............................... | 364/900 |
| 4,562,306 | 12/1985 | Chou et al. ............................. | 364/300 |
| 4,672,572 | 6/1987 | Alberg .................................... | 364/900 |
| 4,714,989 | 12/1987 | Billings .................................. | 364/200 |
| 4,757,534 | 7/1988 | Matyas et al. .......................... | 380/25 |
| 4,796,181 | 1/1989 | Wiedemer .............................. | 364/408 |
| 5,047,928 | 9/1991 | Weidemer ............................... | 364/406 |
| 5,067,154 | 11/1991 | Hosobuchi et al. .................... | 380/25 |
| 5,103,478 | 4/1992 | Matyas et al. .......................... | 380/25 |
| 5,319,705 | 6/1994 | Halter et al. ............................ | 380/4 |
| 5,337,357 | 8/1994 | Chou et al. ............................. | 380/4 |
| 5,343,524 | 8/1994 | Mu et al. ................................ | 380/4 |
| 5,509,070 | 4/1996 | Schull ..................................... | 380/4 |

*Primary Examiner*—Robert W. Beausoliel, Jr.
*Assistant Examiner*—Dieu-Minh Le
*Attorney, Agent, or Firm*—Staas & Halsey

[57] ABSTRACT

There is provided a false statement determination system capable of determining the truth of the statement made by a user in a software distribution system comprising at least one user terminal and a center connected to the user terminal. The user terminal is notified by the center of decoding information on condition that a user of the user terminal pays for software which is supplied to the user in a coded form and then decodes the coded software by using the decoding information.

13 Claims, 11 Drawing Sheets

FALSE STATEMENT DETECTION SYSTEM

BACKGROUND OF THE INVENTION

The present invention relates to a false statement detection system used for system distributing software such as computer programs and copyrighted video materials, especially software in digital form.

Image and audio data as well as computer programs have been distributed more and more with the advanced technologies of secondary storage mediums having large capacities such as CD-ROMs and magneto-optics (MOs), high-speed communication systems using broadband integrated services digital network (BISDN), and community antenna televisions (CATVs).

More specifically, copyrighted video materials conventionally provided on a video tape may be stored on a storage medium such as CD-ROM for distribution. There are also some computer games using the interactive properties of CD-ROMs. Communication lines also are used for supplying software such as copyrighted video materials to users.

The digital information of the type described above can be copied easily in a simple manner. In addition, the duplicated digital information does not deteriorate in quality in contrast to analog information. The digital information can thus be duplicated with the same quality. Such duplication of the digital information may give damages to manufacturers. More specifically, a user can duplicate the contents of CD-ROMs with some knowledge about computers if he or she has an erasable magneto-optical disk or a magnetic disk device having a large capacity.

In most cases, the manufacturers of the media prohibit rental of such digital information media on the grounds that it is impossible to provide enough security against possible false.

From the viewpoint of end users, however, such software is relatively expensive. The end users may think twice to buy software before they confirm that the software in question is available in his or her hard disk device or that it is the just one they want. With this respect, a recent software distribution system stores a large number of software programs of which functions are limited on a CD-ROM for distribution at a relatively low price. The end users pay for their desired software to obtain a code for eliminating the functional limitations. In such distribution system the end user eliminates the functional limitations to the software by using the code obtained on the payment for it and installs the software into his or her hard disk device. It is, however, that the user is expected to state to a distributor that the installation is not accomplished normally by obtaining another code or requesting to refund the money for the software.

Furthermore, a user who completes the installation normally or who hasn't paid for the software may request to refund the money under the pretext that he or she failed installation. In such a case, it is difficult or almost impossible to verify the truth of the statement.

An object of the present invention is thus to provide a false statement detection system that is capable of determining the truth of a statement associated with the matter whether the installation is terminated normally in the above mentioned software distribution system.

SUMMARY OF THE INVENTION

The above mentioned object is achieved by the present invention.

The present invention is a technique that can be used advantageously for a software distribution system which comprises user terminals and a center. The center notifies an user terminal of decoding information on a condition that a user of the user terminal pays for software which is supplied to the user in a coded form. Then, the user terminal decodes the coded software by using the decoding information in order to install the software into the user terminal.

More specifically, the false statement detection system comprises receiving means, analyzing means, and dishonest user recording means provided in the center.

The receiving means receives, when a statement data indicating whether installing operation of the software is accomplished normally and an attribute data associated with the volume of the software are supplied thereto from the user terminal, the statement data and the attribute data.

The analyzing means analyzes the attribute data received by the receiving means to determine whether an installing operation of the software is accomplished normally.

The dishonest user recording means records user identification data identifying a user who makes a false statement. When the result of analysis obtained by the analyzing means is different from the statement data, the analyzing means records user identification data of the user.

The attribute data may be a hashing code obtained through processing a predetermined hash function to which the software is applied. Alternatively, the attribute data may be data which indicates the size of the software.

A following false statement detection system may be used for the software distribution system. More specifically, the false statement detection system provides the user terminal with attribute data storage means, statement request acceptance means, and statement means. The false statement detection system further provides the center, with analyzing means, dishonest user determination means, and dishonest user recording means.

The attribute data storage means stores attribute data associated with the volume of the information of which installation is completed.

The statement request acceptance unit accepts an input of a processing result identification data which indicates that an installing operation of the software is accomplished normally or not. The processing result identification data is entered by the user.

The statement means sends to the center the attribute data stored in the attribute data storage means and the processing result identification data accepted by the statement request accepting means.

The analyzing means in the center analyses the attribute data to determine whether installing operation of the software is accomplished normally, when the processing result identification data and the attribute data are supplied from the user terminal.

The dishonest user determination means determines whether the result of analysis obtained by the analyzing means is coincident with the processing result identification data.

The dishonest user recording means records a user identification data which identifys the user if the result of analysis is different from the processing result identification data.

The dishonest user detection system may provide. The user terminal with first attribute data storage means, second attribute data storage means, statement means, and notification means. The dishonest user detection system may provide the center with decoding means, comparison means, and dishonest user recording means. In this event, the first attribute data storage means stores an attribute data associated with the volume of the software of which installation is accomplished. The second attribute data storage means stores the data which is obtained by coding the attribute data. The statement means states to the center the attribute data stored in the first attribute data storage means. The notification means notifies the center of the coded attribute data stored in the second attribute data storage means.

The decoding means in the center decodes the coded attribute data from the user terminal. The comparison means compares the coded attribute data decoded by the decoding means with the attribute data supplied from the user terminal. The dishonest user recording means records an identification data identifying a user who dishonestly or illegally rewrite the attribute data stored in the first storage area. When the coded attribute data is different from the attribute data, the dishonest user recording means records a user identification data identifying the user.

The false statement detection system may provide the user terminal with first attribute data storage means, second attribute data storage means, statement request acceptance means, statement means, and notification means. The false statement detection means may provide the center with decoding means, comparison means, analyzing means, dishonest user determination means, and dishonest user recording means.

The first attribute data storage means in the user terminal stores an attribute data associated with the volume of the software of which installation is accomplished. The second attribute data storage means stores the data which is obtained by coding the attribute data. The statement request acceptance means accepts an input of processing result identification data to identify whether the program is installed normally. The statement means sending to the center the attribute data stored in the first attribute data storage means and the processing result identification data accepted by the statement request acceptance means. The notification means notifies the center of the coded attribute data stored in the second attribute data storage means.

The decoding means in the center decodes the coded attribute data when it is supplied with the processing result identification data, the attribute data, and the coded attribute data from the user terminal. The comparison means compares the coded attribute data decoded by the decoding means with the attribute data. The analyzing means analyses the attribute data to determine whether installing operation of the software is terminated normally when two attribute data are the same. The dishonest user determination means determines whether the result of analysis obtained by the analyzing means is coincident with the processing result identification data. The dishonest user recording means records the user identification data to identify the user when the coded attribute data is different from the attribute data, or when the result of analysis obtained by the analyzing means is different from the processing result identification data.

The center may further comprise attribute data storage means for previous storage of the attribute data for software. In this event, the analyzing means compares the attribute data supplied from the user terminal with the attribute data stored in the attribute data storage means. The analyzing means determines that installing operation of the software is accomplished normally when these attribute data coincide with each other. If these attribute data are different from each other, installing operation of the software is determined to be not accomplished normally.

The dishonest user determination means may supply the user terminal with a warning message when it determines that the statement of the user is improper or invalid.

The user terminal may further comprise display means for displaying the warning message supplied from the center.

The false statement detection apparatus may be applied to the software distribution system.

The false statement detection apparatus comprises processing result determination means, dishonest user determination means, and dishonest user recording means. The processing result determination means analyzes the software which has installed into the user terminal to determine whether installing operation is accomplished normally or not. The dishonest user determination means compares the result of determination obtained by the processing result determination means with the user states indicating whether installing operation of the software is accomplished normally in order to determine whether the user statement is proper. The dishonest user recording means records the user identification data to identify the user when the dishonest user determination means determines that the statement is improper.

DETAILED DESCRIPTION OF THE PREFERRED EMBODIMENT

Figure 1:
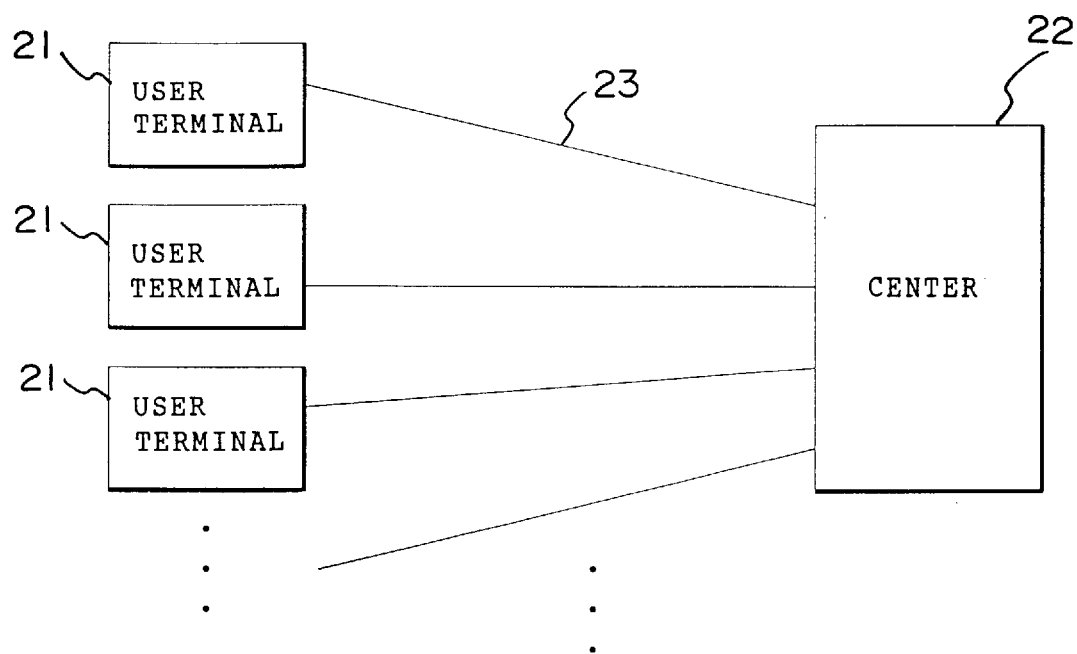
FIG. 1 is a block diagram of a software distribution system to which the present invention is applied.

An embodiment of the present invention is described below with reference to the drawing.

FIG. 1 is a block diagram schematically showing a structure of a software distribution system to which a false statement detection system according to the present invention is implemented.

This software distribution system provides users with a coded contents(which is software such as program, data, etc) stored on a CD-ROM or any other recording media. The contents may be down-loaded through the line directly to the user. For the purpose of simplification, the contents provided to the users in this way are hereinafter referred in general as software. The user can obtain a decoding key for the software to decode the contents when he or she pays for the software. More specifically, the software distribution system described herein comprises a number of user terminals 21 connected to a common center 22 through digital communication lines 23. The user can communicate with the center through the line to pay for the software or to receive the decoding code. As to the payment, the users may notify the center of the number of his or her credit card or a banking account number on the one hand for direct charge to a user's banking account, or may transfer the payment in advance by bank remittance on the other hand.

In this embodiment, it is assumed that the contents have their own check code. This check code is obtained by means of coding a specific coding data (described in detail below) with a decoding key assigned to the contents. The coding data can be used commonly by each contents and is stored on a read-only memory provided in the user terminal 21 (see FIG. 3). When the stored contents and the check code are decoded with a proper decoding key, the decoded check code should be the same as the coding data stored on the ROM 25.

Figure 2:
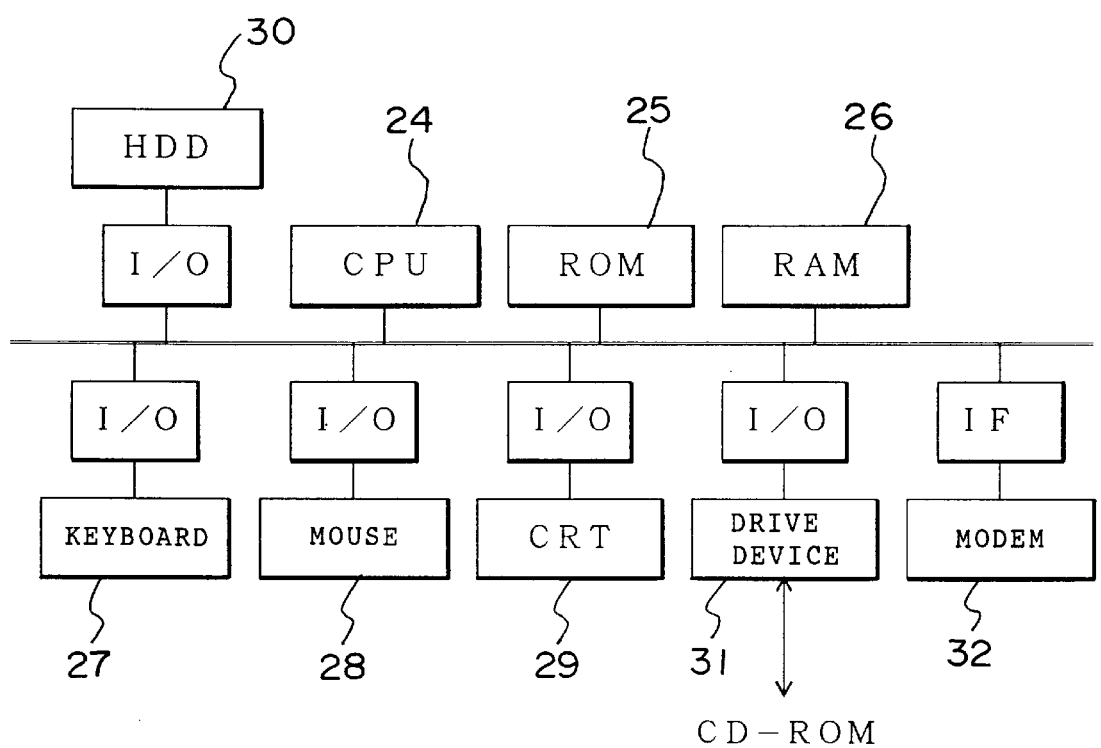
FIG. 2 is a block diagram of a user terminal.

FIG. 2 is a block diagram showing an exemplified construction of the user terminal 21 according to the present invention. The user terminal 21 comprises a central processing unit (CPU) 24, a read-only memory (ROM) 25, and a random access memory (RAM) 26. The CPU 24, the ROM 25, and the RAM 26 are connected with each other through a bus. The user terminal 21 also comprises a keyboard 27, a mouse 28, a cathode-ray tube (CRT) 29, a hard disk device (HDD) 30, and a drive device 31 all of which are connected to the bus through respective input and output (I/O) devices. The bus is connected to a modem 32 through an interface (IF). The modem is connected to the communication line 23 for the communication with the center 22. The ROM 25 stores program(s) to be executed by the CPU 24 along with machine ID files 25a that are used for identifying individual user terminals 21 (see FIG. 3). The RAM 26 stores data processed by the CPU 24.

The CPU 24 executes the program(s) stored on the ROM 25 for the communication between the user terminal 21 and the center 22, the decoding of the coded contents, and the installation of the decoded contents. The keyboard 27 and the mouse 28 are input devices with which the user enters a command or a data. The CRT 29 displays an image data or messages supplied from the center 22.

The hard disk device (HDD) 30 is a storage device into which the decoded contents are installed. The hard disk device (HDD) 30 has an installation area 30a for installation of contents and a second code data storage area 30b (see FIG. 3). The installation area 30a is divided into a contents area, a contents ID area, and a first code data storage area. The contents area is for installation of the contents. The contents ID area is for storing contents IDs to identify the contents installed into the contents area. The first code data storage area is for storing an attribute data of the present invention, i.e., a hashing code obtained during the calculation of the contents by using a hashing function. The second code data storage area 30b is for storing data (hereinafter, referred to as a coded hashing code) obtained by means of coding the hashing code that is same as the hashing code stored in the first code data storage area. It is noted that a user cannot access the second code data storage area 30b.

The drive device 31 is for reading a desired contents out of, for example, the CD-ROM. The modem 32 converts the data processed on the user terminal 21 into a data in digital format for the transmission through the communication line 23 to the center 22 in this embodiment. When receiving digital data transmitted from the center 22 through the communication line 23, the modem 32 converts it in analog format for the subsequent processing on the user terminal 21.

Figure 3:
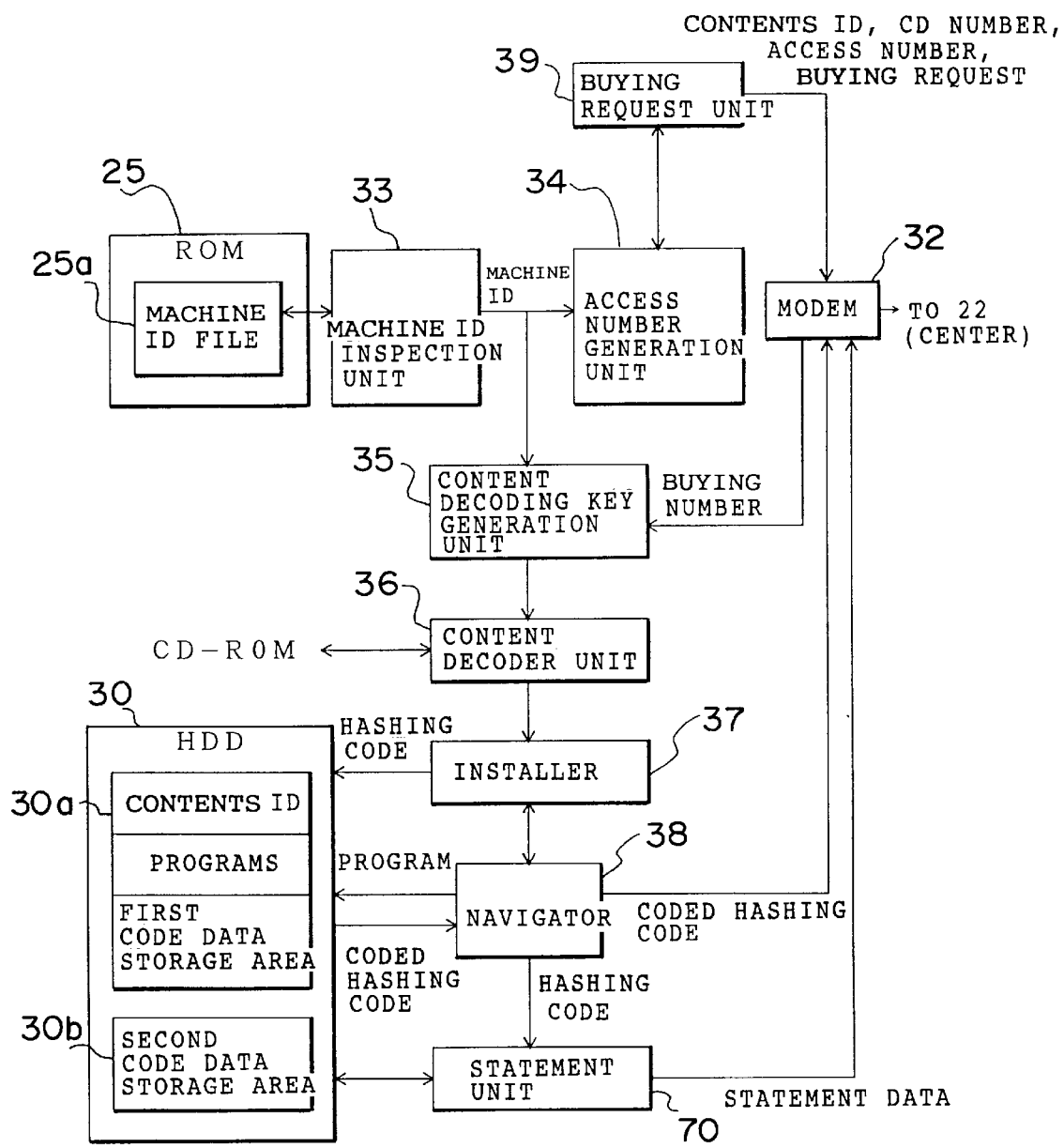
FIG. 3 is a functional block diagram of the user terminal.

Now, description is made on functions of the user terminal 21 achieved as a result that CPU 24 carries out the program (s) stored on the ROM 25. As shown in FIG. 3, the user terminal 21 comprises a machine ID inspection unit 33, an access number generation unit 34, a content decoding key generation unit 35, a content decoder unit 36, an installer 37, a navigator 38, a buying request unit 39, and a statement unit 70.

The machine ID inspection unit 33 reads machine IDs out of the machine ID file 25a in the ROM 25. The access number generation unit 34 generates an access number. More particularly, the access number generation unit 34 substitutes an arithmetic equation previously determined between the unit 34 and the center 22 for the machine ID and a CD number for identifying the CD-ROM on which the contents is recorded to provide the access number. The content decoding key generation unit 35 generates a decoding key that serves as decoding information by using a buying number received from the center. The buying number is notified to the user by the center 22 in cash on delivery. More specifically, the buying number is a data obtained by means of coding the decoding key with the machine ID. The content decoding key generation unit 35 thus decodes the buying number entered by the user with the machine ID to generate the decoding key. The content decoding unit 36 decodes the contents read out of the CD-ROM with the decoding key generated by the content decoding key generation unit 35. The installer 37 installs the contents decoded by the content decoding unit 36 into the hard disk device (HDD) 30.

Figure 4:
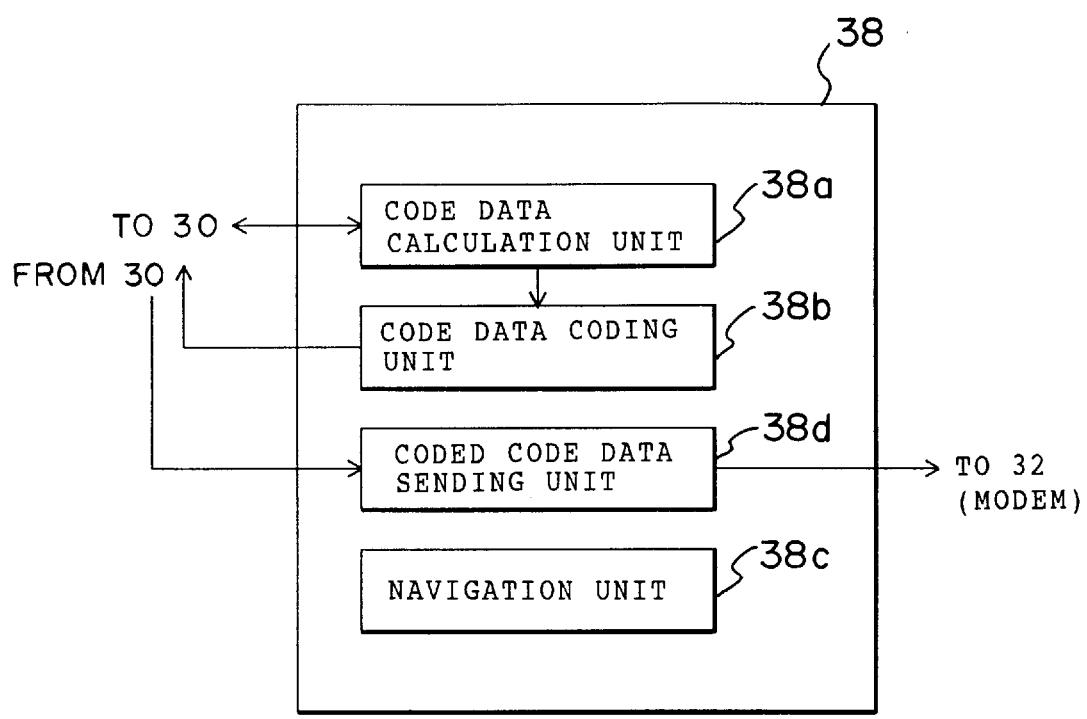
FIG. 4 is a functional block diagram of a navigator.

The navigator 38 controls the installer 37, and generates a hashing code by means of manipulation performed on the installed contents using a hashing function. The navigator 38 then writes the generated hashing code into the first code data storage area of the hard disk device (HDD) 30 and codes the hashing code to write it into the second code data storage area 30b thereof. A functional structure of the navigator 38 is described now with reference to FIG. 4.

The navigator 38 comprises a code data generation unit 38a, a code data coding unit 38b, a navigation unit 38c, and a coded code data sending unit 38d. The code data generation unit 38a generates a hashing code by means of manipulation performed with a hashing function on the contents installed in the first code data storage area of the hard disk device (HDD) 30. The code data generation unit 38a stores the generated hashing code on the first code data storage area of the hard disk device (HDD) 30 and sends it to the code data coding unit 38b. The code data coding unit 38b codes the hashing code supplied from the code data generation unit 38a by using a code data previously determined between the center 22. The code data coding unit 38b then stores the coded hashing code on the second code data storage area 30b of the hard disk device (HDD) 30. The coded code data sending unit 38d sends the coded hashing code stored on the second code data storage area 30b to the center 22 when termination of the installation is notified to the center. The navigation unit 38c realizes conventional navigator functions. For example, the navigation unit 38c controls activation and stop of the installer 37.

Turning back to FIG. 3, the buying request unit 39 notifies, in response to the reception of a buying request command, a software that the user wants to buy, and the CD number of the CD-ROM on which the target contents is stored which are entered through the keyboard 27 or the mouse 28, the access number generation unit 34 of the CD number. The buying request unit 39 then supplies a buying request, the contents ID, the CD number, and the access number when the access number generation unit 34 generates that access number.

The statement unit 70 has a function to notify the center 22 of the result of installation of the contents executed by the installer 37. More specifically, the statement unit 70 searches for, when the user enters through the keyboard 27 or the mouse 28 a statement request command, an identification data indicating whether the installation is terminated normally (hereinafter, referred to as a processing result identification data), the contents ID of the contents to be installed, the access number, and the buying number for the contents, from the hard disk device (HDD) 30 by using the contents ID as a keyword to read the hashing code out of the first code data storage area of the installation area 30a corresponding to the contents ID. The statement unit 70 then puts the read hashing code with the received data (processing result identification data, the contents ID, the access number, and the buying number) to send the combination to the center 22. The data obtained by means of putting the hashing code to the processing result identification data, the contents ID, the access number, and the buying number, is referred hereinafter to as a statement data.

Figure 5:
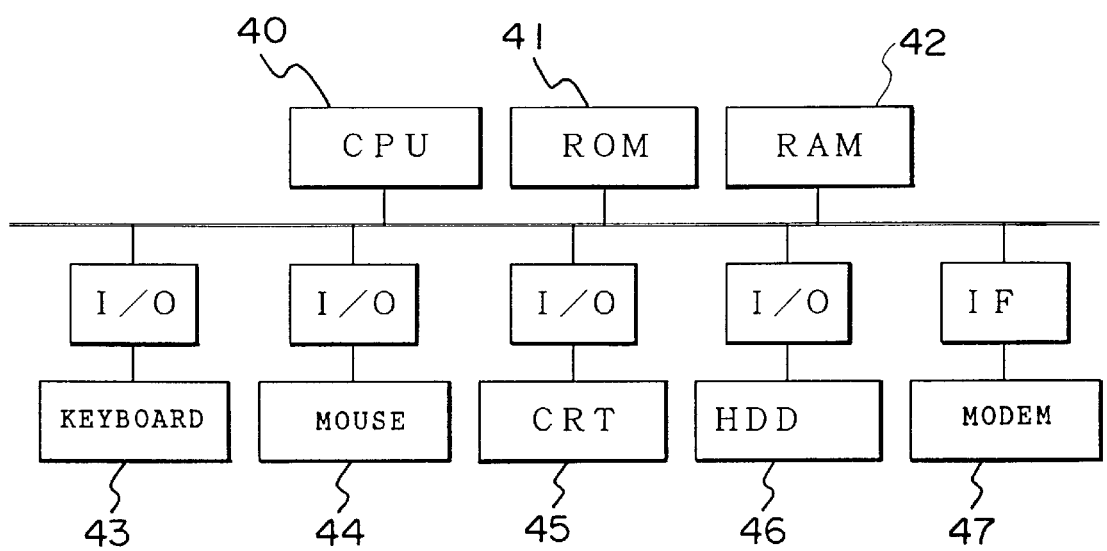
FIG. 5 is a block diagram of a center.

Next, the center 22 in the present embodiment is described. Referring to FIG. 5, the center 22 comprises, a central processing unit (CPU) 40, a read-only memory (ROM) 41, and a random access memory (RAM) 42. The CPU 40, the ROM 41, and the RAM 42 are connected with each other through a bus. The bus is also connected to a keyboard 43, a mouse 44, a cathode-ray tube (CRT) 45, and a hard disk device (HDD) 46 through respective input and output (I/O) devices. A modem 47 is connected to the bus through an interface (IF).

Figure 6:
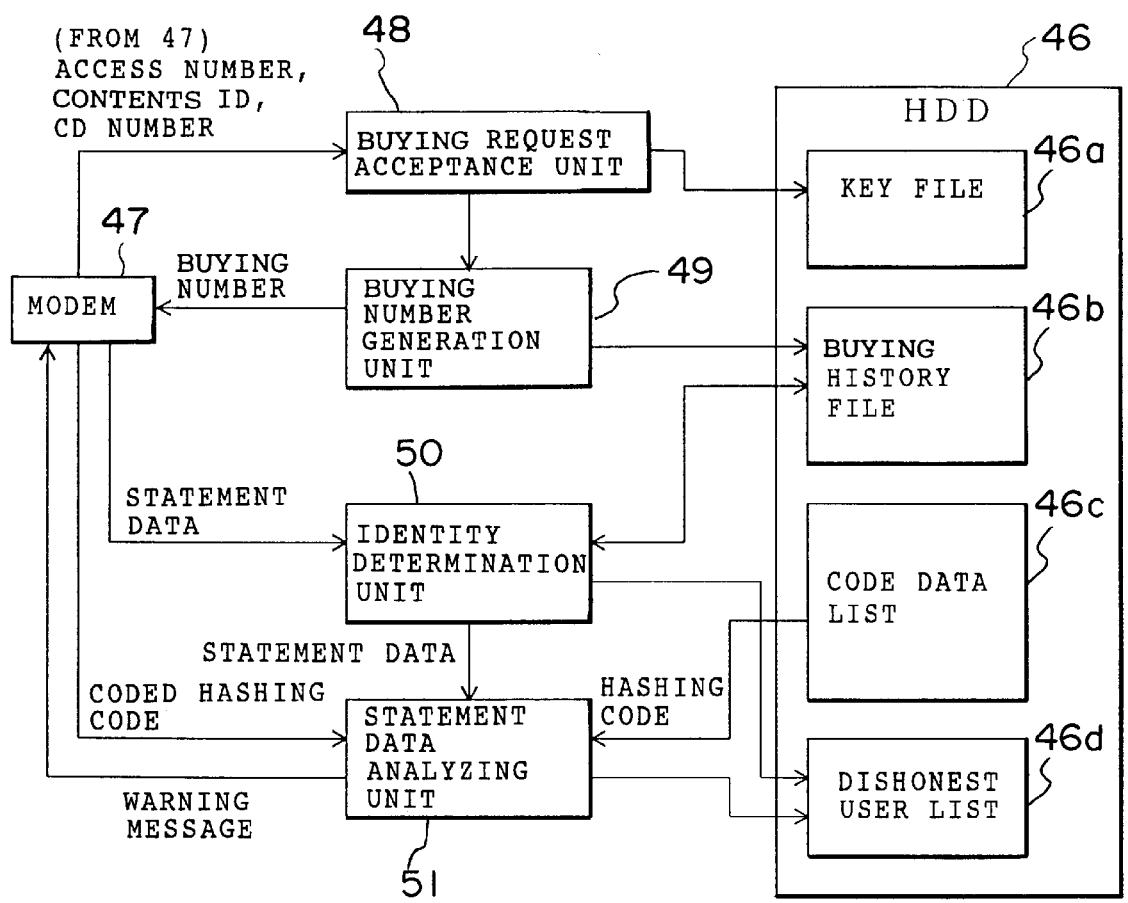
FIG. 6 is a functional block diagram of the center.

The ROM 41 stores programs to be executed by the CPU 40. The hard disk device (HDD) 46 stores a key file 46a, a buying history file 46b, a code data list 46c, and a dishonest user list 46d as shown in FIG. 6. The key file 46a records the decoding key for the contents for each ID thereof. The buying history file 46b records buying histories of the users including data stored for each access number such as the ID of the software a user bought and the buying number sent to the user cash on delivery. The code data list 46c previously stores for each contents the hashing code (hereinafter, referred to as a reference hashing code) obtained by means of operation similar to the operation carried out at the user terminal 21. The code data list 46c stores the reference hashing code for each contents ID of the contents. The dishonest user list 46d realizes the dishonest user recording means of the present invention, which records the access number of the dishonest user who made a false statement. The access number is used to identify such dishonest user.

Turning back to FIG. 5, the CPU 40 executes the program stored on the ROM 41 to communicate with the user terminals 21, to conduct accounting, to generate the buying number, or to determine a dishonest user. The keyboard 43 and the mouse 44 are for an operator at the center 22 to enter any data and commands. The CRT 45 displays image data on a screen. The modem 47 is connected to the communication line 23 to send and receive information to and from the user terminals 21.

Referring to FIG. 6, described are functions of the center 22 realized when the CPU 40 executes the program on the ROM 41. As shown in the figure, the center 22 comprises a buying request acceptance unit 48, a buying number generation unit 49, an identity determination unit 50, and a statement data analyzing unit 51.

The buying request acceptance unit 48 accepts a buying request from the user terminal 21. More specifically, in response to the reception of the buying number, the access number, the contents ID, and the CD number, the buying request acceptance unit 48 reads the decoding key corresponding to the contents ID out of the key file 46a in the hard disk device (HDD) 46. The buying request acceptance unit 48 then notifies the buying number generation unit 49 of the CD number, the read decoding key, the access number, and the contents ID.

Figure 7:
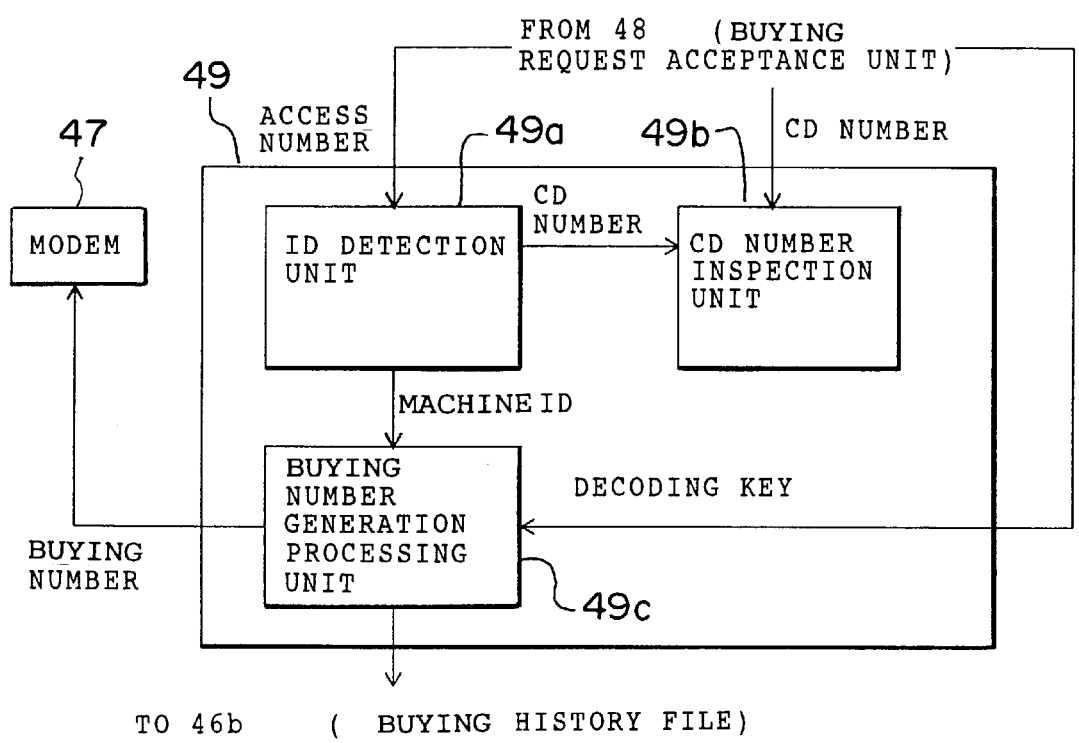
FIG. 7 is a functional block diagram of a buying number generation unit.

In response to the reception of the access number, the CD number, and decoding key, and contents ID from the buying request acceptance unit 48, the buying number generation unit 49 first generates a buying number by using the access number, the CD number, and the decoding key. The buying number generation unit 49 then registers the generated buying number, the access number, and the contents ID to the buying history file 46b. The buying number generation unit 49 also sends the generated buying number to the user terminal 21. As shown in FIG. 7, the buying number generation unit 49 comprises an ID detection unit 49a, a CD number inspection unit 49b, and a buying number generation processing unit 49c. In response to the reception of the access number from the buying request acceptance unit 48, the ID detection unit 49a substitutes an arithmetic equation previously determined between the buying request acceptance unit 48 and the user terminal 21 for this access number to calculate the machine ID and the CD number. The arithmetic equation used at that time is the backward-arithmetic equation of the arithmetic equation used by the access number generation unit. The ID detection unit 49a then notifies the CD number inspection unit 49b and the buying number generation processing unit 49c of the calculated CD number and the machine ID, respectively. The CD number inspection unit 49b compares the CD number supplied from the buying request acceptance unit 48 with the CD number calculated by the ID detection unit 49a to determine whether these two numbers are the same. If the numbers do not coincide with each other the CD number inspection unit 49b interrupts the processing and indicates the user of it. If these numbers coincide with each other, the CD number inspection unit 49b activates the buying number generation processing unit 49c. The buying number generation processing unit 49c codes the decoding key received from the buying request acceptance unit 48 by using the machine ID calculated by the ID detection unit 49a and supplies the coded machine ID as a buying number to the user terminal 21. The buying number generation processing unit 49c then writes the buying number, the access number, and the contents ID into the buying history file 46b.

Turning back to FIG. 6, the identity determination unit 50 determines, when it receives the statement request from the user terminal 21, whether the declaring user is the one who bought the software. More specifically, the identity determination unit 50 picks the access number, the contents ID, and the buying number up from the received statement data. The identity determination unit 50 then searches for the buying history file 46b in the hard disk device (HDD) 46 using the picked-up access number as a keyword to read the contents ID and the buying number corresponding to the access number. The identity determination unit 50 compares the contents ID picked up from the statement data with the contents ID in the buying history file 46c. If these contents IDs coincide with each other, the identity determination unit 50 compares the buying number picked up from the statement data with the buying number in the buying history file 46b. If these buying numbers coincide with each other, the identity determination unit 50 determines that the statement declaring user is a proper one. The identity determination unit 50 thus sends the received statement data to the statement data analyzing unit 51. On the other hand, if at least one of the contents ID and the buying number is/are not coincident, the identity determination unit 50 determines that the declaring user is a dishonest user who is under the pretext of an actual buyer and registers the access number of that user in the dishonest user file 46d in the hard disk device (HDD) 46. The identity determination unit 50 then sends a warning message to the user terminal 21 of the declaring user.

Figure 8:
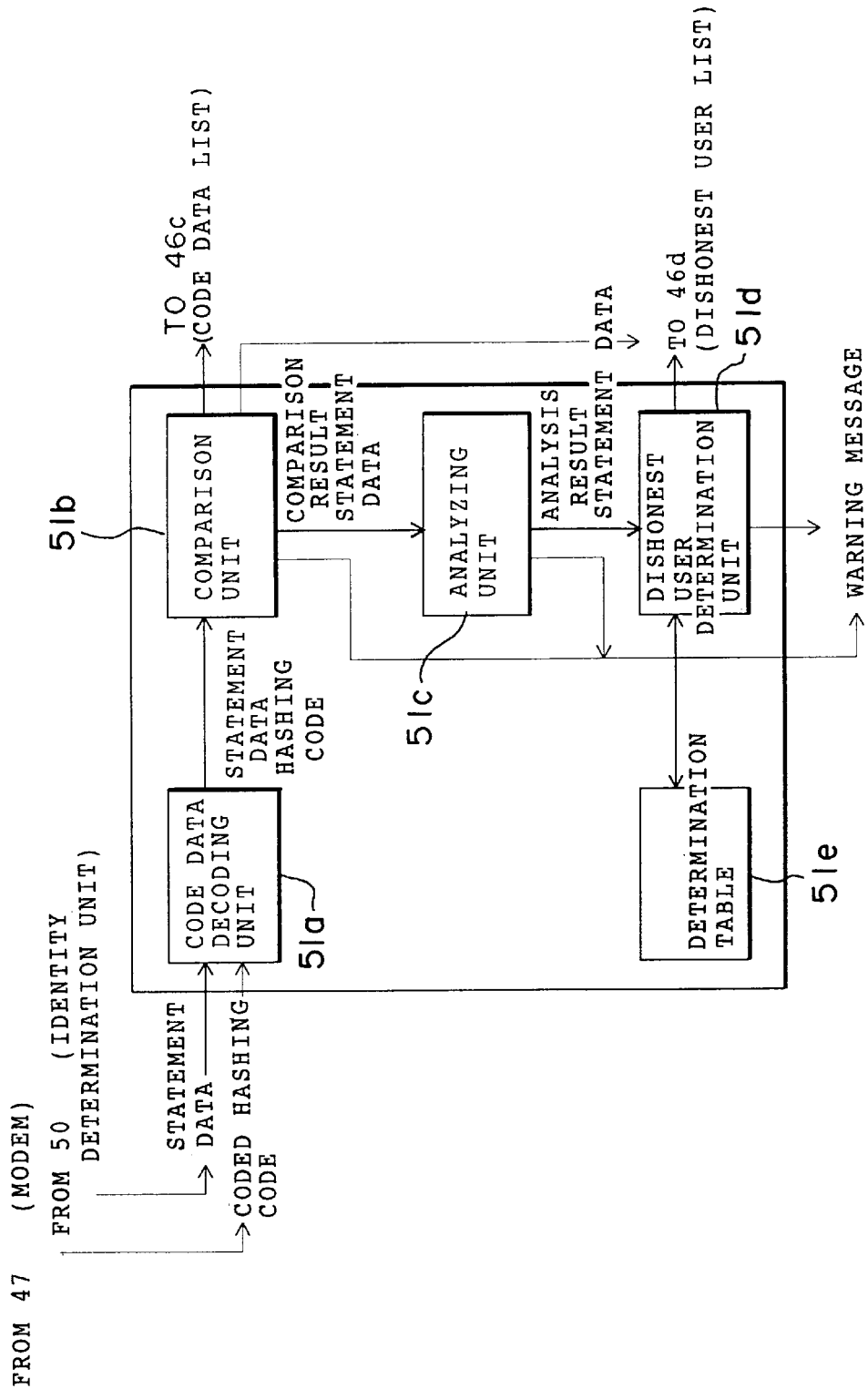
FIG. 8 is a functional block diagram of a statement data analyzing unit.

In response to the reception of the statement data supplied from the identity determination unit 50 as well as the coded hashing code supplied from the user terminal 21, the statement data analyzing unit 51 analyzes these data to determine whether the statement from the declaring user is proper or not. If the statement data analyzing unit 51 determines that the statement is an illegal or false one, it registers the access number of that user in the dishonest user list 46d in the hard disk device (HDD) 46. More specifically, the statement data analyzing unit 51 comprises, as shown in FIG. 8, a code data decoding unit 51a, a comparison unit 51b, an analyzing unit 51c, a dishonest user determination unit 51d, and a determination table 51e.

The code data decoding unit 51a receives the coded hashing code from the user terminal 21. The code data decoding unit 51 decodes the coded hashing code in a manner reverse to the coding operation carried out by the user terminal 21. The code data decoding unit 51a supplies the statement data sent from the identity determination unit 50 and the decoded hashing code to the comparator 51b.

In response to the statement data and the decoded hashing code supplied from the code data decoding unit 51a, the comparison unit 51b picks the hashing code (hereinafter, referred to as a statement hashing code) up from the statement data. Next, the comparison unit 51b compares the statement hashing code with the decoded hashing code. If these hashing codes are coincident with each other, the comparison unit 51b supplies the statement data sent from the code data decoding unit 51a to the analyzing unit 51c to activate the latter. On the other hand, if these hashing codes are different from each other, the comparison unit 51b determines that the user states a false hashing code. Accordingly, the comparison unit 51b registers the access number of that user in the dishonest user list 46b in the hard disk device (HDD) 46 and sends the warning message to the user terminal.

In response to the comparison result and the statement data supplied from the comparison unit 51b, the analyzing unit picks up the contents ID and the statement hashing code from the statement data. The analyzing unit 51c then searches for the code data list 46c by using the picked-up contents ID as a keyword to read the reference hashing code corresponding to the contents ID. The analyzing unit 51c compares the statement hashing code with the reference hashing code. The analyzing unit 51c then supplies to the dishonest user determination unit 51d a data (hereinafter, referred to as an analysis result) to determine whether the statement hashing code is coincident with the reference hashing code, and the statement data supplied.

In response to the analysis result and the statement data supplied from the analyzing unit 51c, the dishonest user determination unit 51d picks up the processing result identification data from the statement data. The dishonest user determination unit 51d looks up the determination table 51e by using the processing result identification data and the supplied analysis result as keywords to determine whether the statement of the user is proper.

The determination table 51e contains data for use in determining whether the statement is proper. More specifically, the determination table 51e contains:

1. processing result identification data: normal termination of installation
   result of analysis: same hashing codes
   determination: proper statement
2. processing result identification data: normal termination of installation
   result of analysis: different hashing codes
   determination: improper statement
3. processing result identification data: abnormal termination of installation
   result of analysis: different hashing codes
   determination: proper statement
4. processing result identification data: abnormal termination of installation
   result of analysis: same hashing codes
   determination: improper statement If the dishonest user determination unit 51d looks up the above mentioned determination table 51e and determines that the statement is improper, it registers the access number of the declaring user in the dishonest user list 46d in the hard disk device (HDD) 46. The dishonest user determination unit 51d then sends a warning message to the user terminal 21 of the declaring user.

Operations and effects of the present invention are described below. In the software distribution system of the type described herein, the user terminal 21 sends a buying request to the center 22. In response to this buying request, the center 22 generates a buying number. The center 22 then supplies the buying number to the user terminal 21. The user can thus decode a contents by using this buying number.

Figure 9:
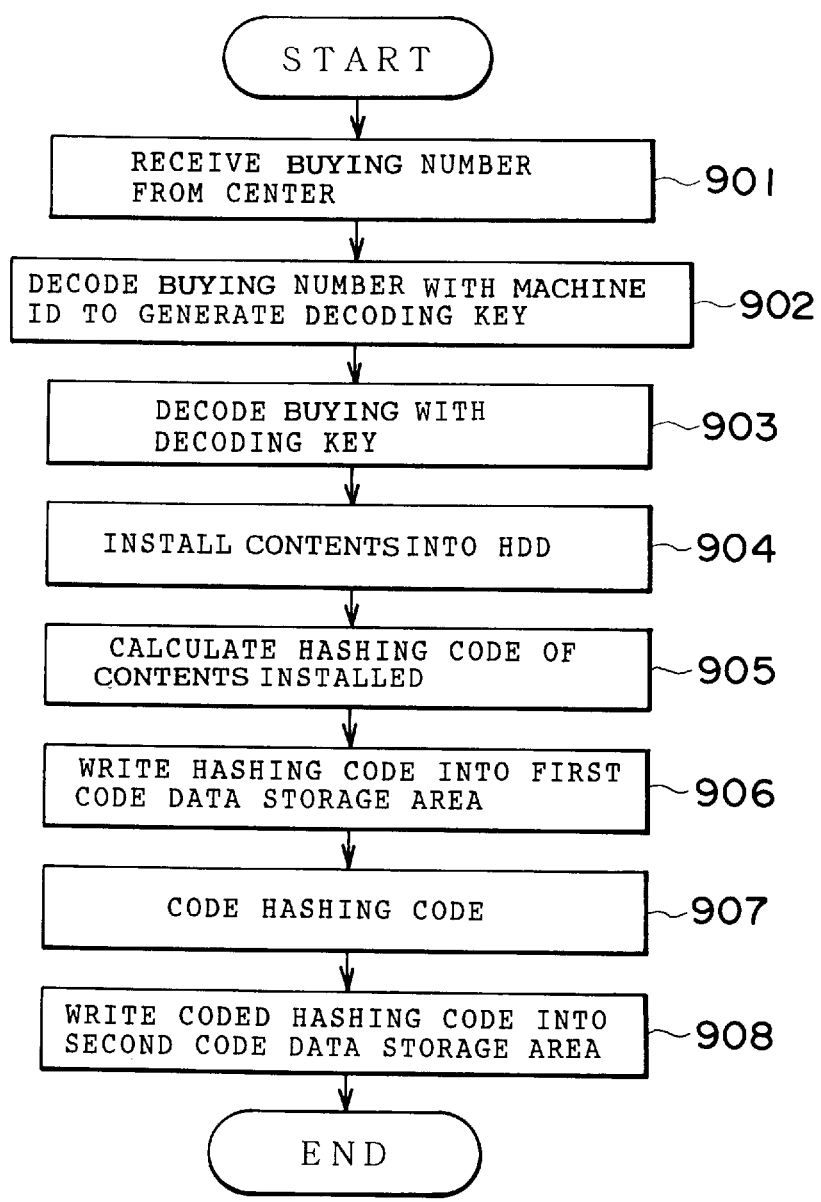
FIG. 9 is a flow chart illustrating operation executed by the user terminal in response to the reception of a buying number.

FIG. 9 shows a flow chart for use in describing operation carried out by the user terminal 21 when it issues the buying request. When the user terminal receives the buying number through the modem 32 (step 901), the CPU 24 reads the machine ID out of the ROM 25 to decode the buying number with this machine ID and generate the decoding key (step 902). The CPU 24 then reads the contents on the CD-ROM through the driver device 31 to decode the read contents with the decoding key generated (step 903). The decoded contents is installed into the installation area 30a of the hard disk device (HDD) 30 (step 904). At that time, the CPU 24 executes manipulation using the hashing function on the contents installed in the installation area 30a. The calculated code data is written into the first code data storage area of the hard disk device (HDD) 30 (step 906). In addition, the calculated code data is coded (step 907) and written into the second code data storage area 30b of the hard disk device (HDD) 30 (step 908).

After the installation, the user checks whether the installation is terminated normally. The user enters with the keyboard 27 or the mouse 28 the statement request command along with the processing result identification data to determine whether the installation is terminated normally, the contents ID of the contents installed, the access number, and the buying number. The user terminal 21 generates the statement data by using the data (processing result identification data, contents ID, access number, buying number) entered along with the statement request command. The user terminal 21 then sends the statement data generated to the center 22.

Figure 10:
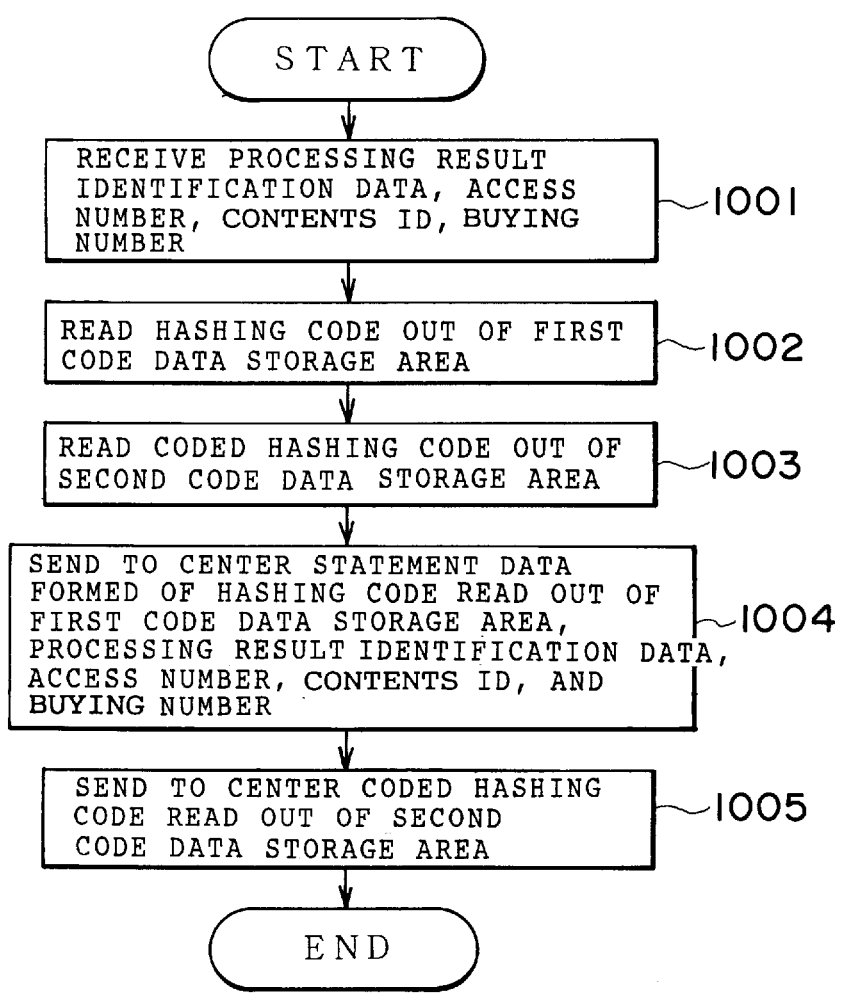
FIG. 10 is a flow chart illustrating operation executed out by the user terminal to send a statement data.

FIG. 10 is a flow chart illustrating operation carried out by the user terminal 21 when the user enters a statement request command.

In response to the reception of the statement request command along with the processing result identification data, the access number, the contents ID and the buying number, the CPU 24 of the user terminal 21 carries out the following operation in accordance with the program stored on the ROM 25.

When the user enters the statement request command, the processing result identification data, the access number, the contents ID and the buying number through the keyboard 27 or the mouse 28 (step 1001), the CPU 24 searches for the hard disk device (HDD) 30 by using the contents ID as a keyword to determine the installation area 30a corresponding to the contents ID. The CPU 24 then reads the hashing code out of the first code data storage area of the installation area 30a determined (step 1002). In addition, the CPU 24 reads the coded hashing code out of the second code data storage area 30b of the hard disk device (HDD) 30 (step 1003). The CPU generates the statement data by means of combining the hashing code read out of the first code data storage area with the processing result identification data, the access number, the contents ID, and the buying number and sends the statement data to the center 22 through the modem 32 (step 1004).

The CPU 24 transfers the coded hashing code read out of the second code data storage area to the modem 32. The modem 32 sends the coded hashing code received to the center 22 (step 1005).

Figure 11:
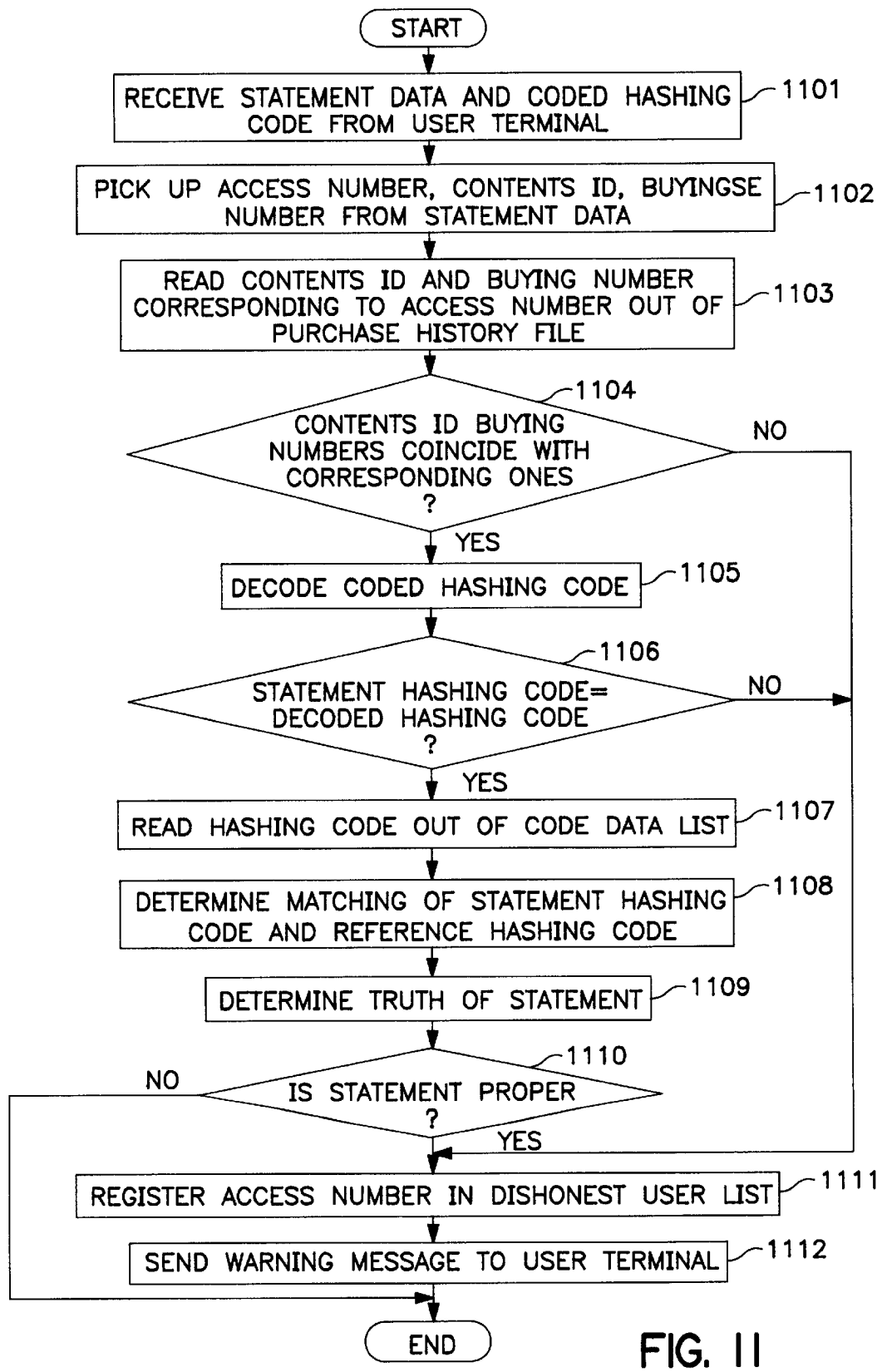
FIG. 11 is a flow chart illustrating operation executed by the center in response to the reception of the statement data.

Referring to FIG. 11, described is the operation of the center 22 upon reception of the statement request. In response to the reception of the statement data (processing result identification data, access number, contents ID, buying number, code data) from the user terminal and the coded hashing code, the CPU 40 carries out the following operation according the program stored on the ROM 41. More specifically, in response the reception of the statement data and the coded hashing code through the modem 47 (step 1101), the CPU 40 picks the access number, the contents ID, the buying number up from the statement data (step 1102). The CPU 40 then searches for the buying history file 46b in the hard disk device (HDD) 46 by using the picked-up access number as a keyword. The CPU 40 reads the contents ID and the buying number corresponding to the access number (step 1103). The CPU 40 compares the contents ID and the buying number read out of the buying history file 46b with those picked up from the statement data, respectively (step 1104). If these IDs coincide with each other and the buying numbers also coincide with each other, the CPU 40 determines that the declaring user is the one who actually bought the software.

When the declaring user is the genuine buyer of the software, the CPU 40 then decodes the coded hashing code received from the user terminal (step 1105). The CPU 40 picks up the statement hashing code from the statement data and compares it with the decoded hashing code (step 1106). If the statement hashing code is same as the decoded hashing code the CPU 40 picks up the contents ID from the statement data. The CPU 40 searches for the code data list 46c in the hard disk device (HDD) 46 by using this contents ID as a keyword. The CPU 40 reads the reference hashing code corresponding to the contents ID out of the code data list 46c (step 1107).

The statement hashing code is compared with the reference hashing code read out of the code data list 46c to determine the matching between the two (step 1108). The CPU 40 picks up the processing result identification data from the statement data to determine the truth of the statement on the basis of this processing result identification data and the data indicative of the matching of the hashing code (steps 1109 and 1110). If the statement of the declaring user is determined to be improper, the access number of the declaring user is recorded on the dishonest user list 46d in the hard disk device (HDD) 46 (step 1111). In addition, the CPU 46 sends the warning message to the user terminal 21 of the declaring user (step 1112). In response to this, the user terminal 21 displays the warning message received from the center 22 on the screen of the CRT 29.

If it is determined at the above mentioned step 1104 that the declaring user is not a genuine user who bought the software, the CPU 40 writes the access number of this user into the dishonest user list 46d in the hard disk device (HDD) 46 (step 1111). The CPU 40 then sends the warding message to the user terminal 21 of the declaring user (step 1112).

If the hashing code picked up from the statement data is different from the decoded hashing code at the step 1106, the declaring user is considered to have rewritten improperly the hashing code stored in the first code data storage area in the hard disk device (HDD) 30. The access number of the declaring user is thus written into the dishonest user list 46d in the hard disk device (HDD) 46 (step 1111), and the warning message is sent to the user terminal 21.

If it is determined at the step 1110 that the statement from the declaring user is proper, the refund processing or the re-distribution of the buying number is carried out.

As mentioned above, according to the embodiment of the present invention, improper statement can be determined through the steps 1108 to 1110 (see FIG. 11) if the user makes a false statement. Likewise, if the user rewrite the hashing code in the installation area 30a of the hard disk device (HDD) 30 for the statement, such improper statement can be determined at the step 1106 (see FIG. 11) described above.

While the embodiment has thus been described in conjunction with the case where the attribute data is the hashing code, data indicative of the size of the contents or any other data may be used equally as long as the objects of the present invention can be realized.

What is claimed is:

1. A false statement detection system used in a software distribution system including at least one user terminal and a center connected to the user terminal, the center notifying the user terminal of decoding information on condition that a user of the user terminal pays for software which is supplied to the user in a coded form, the user terminal decoding the coded software by using the decoding information, wherein the center comprises:

receiving means for receiving a statement data indicating assertion of the user whether the software is installed normally and an attribute data associated with the volume of the software from the user terminal;

analyzing means for analyzing the attribute data and the statement data received by said receiving means to determine whether the installation is accomplished normally;

dishonest user determination means for determining whether the result of analysis obtained by said analyzing means is coincident with the statement data received by said receiving means; and dishonest user recording means for recording a user identification data to identify the user when the result of analysis obtained by said analyzing means is different from the statement data.

2. A false statement detection system as claimed in claim 1, wherein the attribute data is a hashing code which is obtained by means for performing manipulation on the software using a predetermined hashing function.

3. A false statement detection system as claimed in claim 1, wherein the attribute data is a data which indicates the size of the software.

4. A false statement detection system used in a software distribution system including at least one user terminal and a center connected to the user terminal, the center notifying the user terminal of decoding information on condition that a user of the user terminal pays for software which is supplied to the user in a coded form, the user terminal decoding the coded software by using the decoding information, wherein the user terminal comprises:

attribute data storage means for storing attribute data associated with a volume of installed software:

statement request acceptance means for accepting an input of processing result identification data which indicated whether installation of the software is accomplished normally or not; and statement means for sending to the center of the attribute data stored in said attribute data storage means and the processing result identification data accepted by said statement request acceptance means; and wherein the center comprises:

analyzing means for analyzing the attribute data and the processing result identification data to determine whether installation of the software was accomplished normally when supplied from the user terminal;

dishonest user determination means for determining whether the result of analysis obtained by said analyzing means is coincident with the processing result identification data; and dishonest user recording means for recording a user identification data to identify the user when the result of analysis obtained by said analyzing means is different from the processing result identification data.

5. A false statement detection system used in a software distribution system including at least one user terminal and a center connected to the user terminal, the center notifying the user terminal of decoding information on condition that a user of the user terminal pays for software which is supplied to the user in a coded form, the user terminal decoding the coded software by using the decoding information, wherein the user terminal comprises:

first attribute data storage means for storing attribute data associated with a volume of installed software;

second attribute data storage means for storing the coded attribute data obtained by coding the attribute data;

statement means for supplying the attribute data stored in said first attribute data storage means to the center; and notification means for notifying the center of the coded attribute data stored in said second attribute data storage means; and wherein the center comprises:

decoding means for decoding the coded attribute data notified from the user terminal;

comparison means for comparing the coded attribute data decoded by said decoding means with the attribute data supplied from the user terminal; and dishonest user recording means for recording a user identification data which identifies the user when the coded attribute data is different from the attribute data.

6. A false statement detection system used in a software distribution system including at least one user terminal and a center connected to the user terminal, the center notifying the user terminal of decoding information on condition that a user of the user terminal pays for software supplied to the user in a coded form, the user terminal decoding the coded software by using the decoding information, wherein the user terminal comprises:

first attribute data storage means for storing atrribute data associated with a volume of installed software;

second attribute data storage means for storing the data which is obtained by coding the attribute data;

statement request acceptance means for accepting an input of processing result identification data which indicates that installation of the software is accomplished normally or not;

statement means for sending to the center the attribute data stored in said first attribute data storage means and the processing result identification data accepted by said statement request acceptance means; and notification means for notifying the center of the coded attribute data stored in said second attribute data storage means; and wherein the center comprises:

decoding means for decoding the coded attribute data in response to the processing result identification data, the attribute data, and the coded attribute data supplied from the user terminal;

comparison means for comparing the coded attribute data decoded by said decoding means with the coded attribute data;

analyzing means for analyzing the attribute data to determine whether installation of the software is accomplished normally when these attribute data are same;

dishonest user determination means to determine whether the result of analysis obtained by said analyzing means is coincident with the processing result identification data; and dishonest user recording means for recording a user identification data to identify a user of the user terminal when the coded attribute data is different from the attribute data, or when the result of analysis obtained by said analyzing means is different from the processing result identification data.

7. A false statement detection system as claimed in claim 6, wherein the center further comprises:

attribute data storage means for storing an attribute data of the software;

said analyzing means compares the attribute data supplied from the user terminal with the attribute data stored in said attribute data storage means to determine that installation of the software is accomplished normally when these attribute data are same and determine that the installation of the software is not accomplished normally when the attribute data are different from each other.

8. A false statement detection system as claimed in claim 6, wherein the attribute data is a hashing code obtained by means for compressing the software by using a hashing function.

9. A false statement detection system as claimed in claim 6, wherein the attribute data is a data which indicates the volume of the software.

10. A false statement detection system as claimed in claim 6, wherein the dishonest user determination means supplies a warning message to the user terminal when it determines that the statement from the user is improper.

11. A false statement detection system as claimed in claim 10, wherein the user terminal further comprises display means for displaying the warning message supplied from the center.

12. A false statement detection apparatus used in a software distribution system including at least one user terminal and a center connected to the user terminal, the center notifying the user terminal of decoding information on condition that a user of the user terminal pays for software which is supplied to the user in a coded form, the user terminal decoding the coded software by using the decoding information, the false statement detection apparatus comprising:

processing result determination means for determining whether installation of software is accomplished normally by analyzing installed software;

dishonest user determination means for determining, when the user makes a statement to the center indicating whether installation of the software is accomplished normally, whether the statement is proper by comparing the result of determination obtained by said processing result determination means with the statement; and dishonest user recording means for recording a user identification data which identify the user when the statement is improper.

13. A false statement detection apparatus as claimed in claim 12, wherein the dishonest user determination means notifies the user terminal of a warning message when it determines that the statement from the user is improper.

* * * * *